United States Patent [19]

Rhee

[11] Patent Number: 5,737,034
[45] Date of Patent: Apr. 7, 1998

[54] RADIO FREQUENCY MODULATOR HAVING AN AUDIO MULTIPLEX BROADCASTING FUNCTION

[75] Inventor: Nam-hyuk Rhee, Suwon, Rep. of Korea

[73] Assignee: Samsung Electronics Co., Ltd., Kyungki-Do, Rep. of Korea

[21] Appl. No.: 690,147

[22] Filed: Jul. 31, 1996

[30] Foreign Application Priority Data

Jul. 31, 1995 [KR] Rep. of Korea .................. 1995-23465

[51] Int. Cl.$^6$ ................................................ H04N 5/60
[52] U.S. Cl. .................... 348/738; 348/729; 348/480; 348/485; 381/7
[58] Field of Search .......................... 348/738, 729, 348/726, 480, 481, 485; 381/7, 2, 3, 11; 455/149; H04N 5/60

[56] References Cited

U.S. PATENT DOCUMENTS

| | | | |
|---|---|---|---|
| 3,790,714 | 2/1974 | Ohsawa | 179/15 BT |
| 4,703,501 | 10/1987 | Sagai et al. | 381/10 |
| 4,750,206 | 6/1988 | Schotz | 381/4 |
| 5,187,576 | 2/1993 | Na | 358/144 |
| 5,337,196 | 8/1994 | Kim | 360/30 |
| 5,497,206 | 3/1996 | Ji | 348/738 |

FOREIGN PATENT DOCUMENTS

| | | | |
|---|---|---|---|
| 0 299 831 | 1/1989 | European Pat. Off. | G09B 7/00 |
| 464328 | 8/1992 | European Pat. Off. | H04N 5/60 |
| 2 248 740 | 4/1992 | United Kingdom | H04N 7/08 |

*Primary Examiner*—Glenton B. Burgess
*Attorney, Agent, or Firm*—Sughrue, Mion, Zinn, Macpeak & Seas, PLLC

[57] ABSTRACT

A radio frequency (RF) modulation apparatus for modulating input video and audio signals into a television broadcast signal is provided. The apparatus includes a buffer amplifier, a decoder, a switching device, and an RF modulator. The buffer amplifier amplifies and stores the input audio signal as a stored audio signal. The decoder inputs and decodes the stored audio signal to produce a decoded audio signal. The switching device inputs the stored audio signal from the buffer amplifier and the decoded audio signal from the decoder and selectively outputs either the stored audio signal or the decoded audio signal as a selected audio signal. Specifically, the stored audio signal is output as the selected audio signal if the input audio signal corresponds to a stereophonic audio signal or an audio multiplexing signal. On the other hand, the decoded audio signal is output as the selected audio signal if the input audio signal corresponds to a mono audio signal. Finally, the RF modulator modulates the selected audio signal and outputs the corresponding television broadcast signal.

22 Claims, 2 Drawing Sheets

RADIO FREQUENCY MODULATOR HAVING AN AUDIO MULTIPLEX BROADCASTING FUNCTION

RELATED APPLICATION

The present application is based on Korean Application No. 23465/1995 which is incorporated herein by reference for all purposes.

FIELD OF THE INVENTION

The present invention relates to a radio frequency (RF) modulation apparatus which modulates video and audio signals into a television broadcast signal. More particularly, the present invention relates to an RF modulation apparatus which is capable of modulating and outputting an audio multiplexing signal and a stereophonic audio signal.

BACKGROUND OF THE INVENTION

In general, a conventional RF modulation apparatus frequency-modulates video and audio signals supplied from a video apparatus (e.g. a video cassette recorder (VCR) or a game apparatus) to enhance a television broadcast. Furthermore, if the apparatus inputs an audio multiplexing signal, the multiplexing signal is demultiplexed and/or demodulated into various component signals, the component signals are processed to generate a processed audio signal, and the processed audio signal is RF-modulated to produce a television broadcast signal. Since the audio multiplexing signal is demultiplexed and/or demodulated before it is RF-modulated into a television broadcast signal, the broadcast signal no longer comprises an audio multiplexing signal. As a result, a television receiver which receives the broadcast signal cannot process such signal as an audio multiplexing signal. The same problem also applies to stereophonic audio signals which are modulated into frequency broadcast signals by the conventional RF modulation apparatus.

An example of a conventional RF modulation apparatus is illustrated in FIG. 1. In particular, the apparatus comprises a tuner 10, an intermediate frequency (IF) demodulator 11, a video signal processor 12, a multi-television sound (MTS) decoder 13, an audio signal processor 14, and an RF modulator 15.

The tuner 10 inputs video and audio signals via an antenna and selectively outputs a particular video signal and a particular audio signal which are broadcast on a selected channel. Then, the particular audio and video signals are output to the IF demodulator 11, and the demodulator 11 demodulates the signals into an audio IF signal and an video IF signal.

The video IF signal is output to the video signal processor 12 which generates a processed video signal in accordance with the IF signal. Subsequently, the processed video signal is output to a video recorder and the RF modulator 15.

The audio IF signal comprises an MTS signal which is previously generated by multiplexing an audio multiplexing signal and a stereophonic audio signal. The MTS signal is output to and demodulated by the MTS decoder 13. Specifically, the decoder 13 demodulates the MTS signal into the left and right components L and R of the stereophonic audio signal and demodulates the MTS signal into a second audio program signal SAP corresponding to the audio multiplexing signal.

Then, the signals L, R, and SAP are output to the audio signal processor 14, and the processor 14 processes the signals L, R, and SAP to generate a processed audio signal. Afterwards, the processed audio signal is output to the video recorder and the RF modulator 15. The modulator 15 modulates the processed video and audio signals into television broadcast frequency signals, and such frequency signals are output to one or more television receivers.

The conventional RF modulation apparatus described above has several disadvantages. For example, after the MTS signal is output from the IF demodulator 11, it is demultiplexed into the left and right signals L and R of the stereophonic audio signal and the signal SAP of the audio multiplexing signal. Subsequently, the signals L, R, and SAP are processed by the processor 14 and modulated by the RF modulator 15. However, when the stereophonic audio signal is demultiplexed, processed, and modulated, it loses its stereophonic properties. As a result, the RF modulator 15 is only capable of outputting an audio signal on one channel (i.e. a mono audio signal) rather than the stereophonic audio signal.

SUMMARY OF THE INVENTION

In order to overcome the disadvantages of conventional RF modulation apparatuses, an object of the present invention is to provide a RF modulation apparatus capable of outputting a stereophonic audio signal and an audio multiplexing signal after such signals have been modulated.

In order to accomplish the objects of the present invention, an RF modulation apparatus for modulating an input video signal and an input audio signal into a television broadcast signal is provided. Specifically, the apparatus comprises: a buffer amplifier which amplifies said input audio signal to produce an amplified audio signal and stores said amplified audio signal as a stored audio signal; a decoder which inputs said stored audio signal and decodes said stored audio signal to produce a decoded audio signal; switching means for inputting said stored audio signal and said decoded audio signal and for selectively outputting either said stored audio signal or said decoded audio signal as a selected audio signal, wherein said switching means outputs said stored audio signal as said selected audio signal if said input audio signal corresponds to one of a stereophonic audio signal and an audio multiplexing signal and wherein said switching means outputs said decoded audio signal as said selected audio signal if said input audio signal corresponds to a mono audio signal; and an RF modulator which modulates said selected audio signal and outputs said television broadcast signal.

In another embodiment, the RF modulation apparatus comprises: a memory device which stores said input audio signal as a stored audio signal; a decoder which inputs said stored audio signal from said memory device and decodes said stored audio signal to produce a decoded audio signal; a pre-emphasis portion which emphasizes a de-emphasized part of said decoded audio signal to produce a pre-emphasized audio signal, wherein said de-emphasized part corresponds to a portion of said input audio signal which is weakened when said input audio signal is received in order to remove noise from said decoded audio signal; switching means for inputting said stored audio signal and said pre-emphasized audio signal and for selectively outputting either said stored audio signal or said pre-emphasized audio signal as a selected audio signal, wherein said switching means outputs said stored audio signal as said selected audio signal if said input audio signal corresponds to a first audio signal and wherein said switching means outputs said pre-emphasized audio signal as said selected audio signal if said input audio signal corresponds to a second audio signal; and an RF modulator which modulates said selected audio signal and outputs said television broadcast signal.

BRIEF DESCRIPTION OF THE DRAWINGS

The above objects and advantages of the present invention will become more apparent by referring to the detailed description of the preferred embodiments and the corresponding drawings in which.

DETAILED DESCRIPTION OF THE PREFERRED EMBODIMENTS

Figure 1:
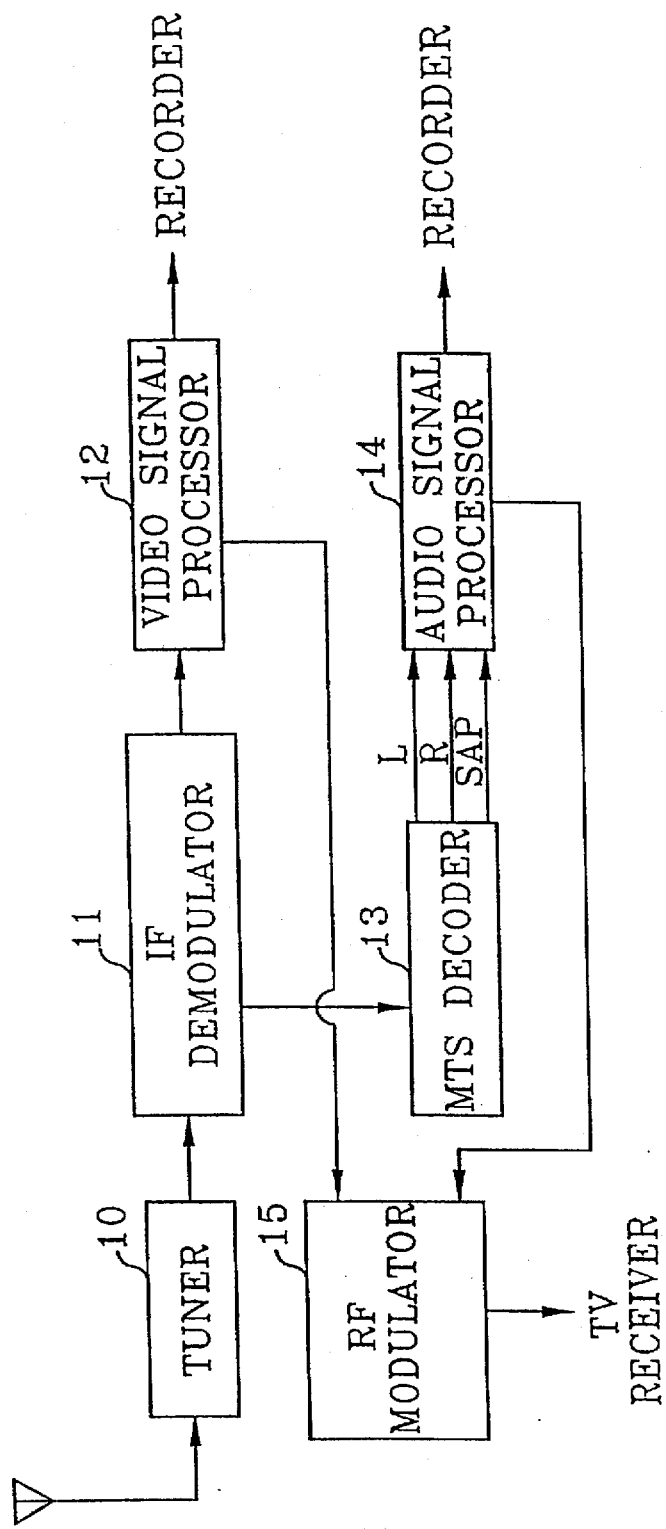
FIG. 1 is a diagram of a conventional RF modulation apparatus.
Figure 2:
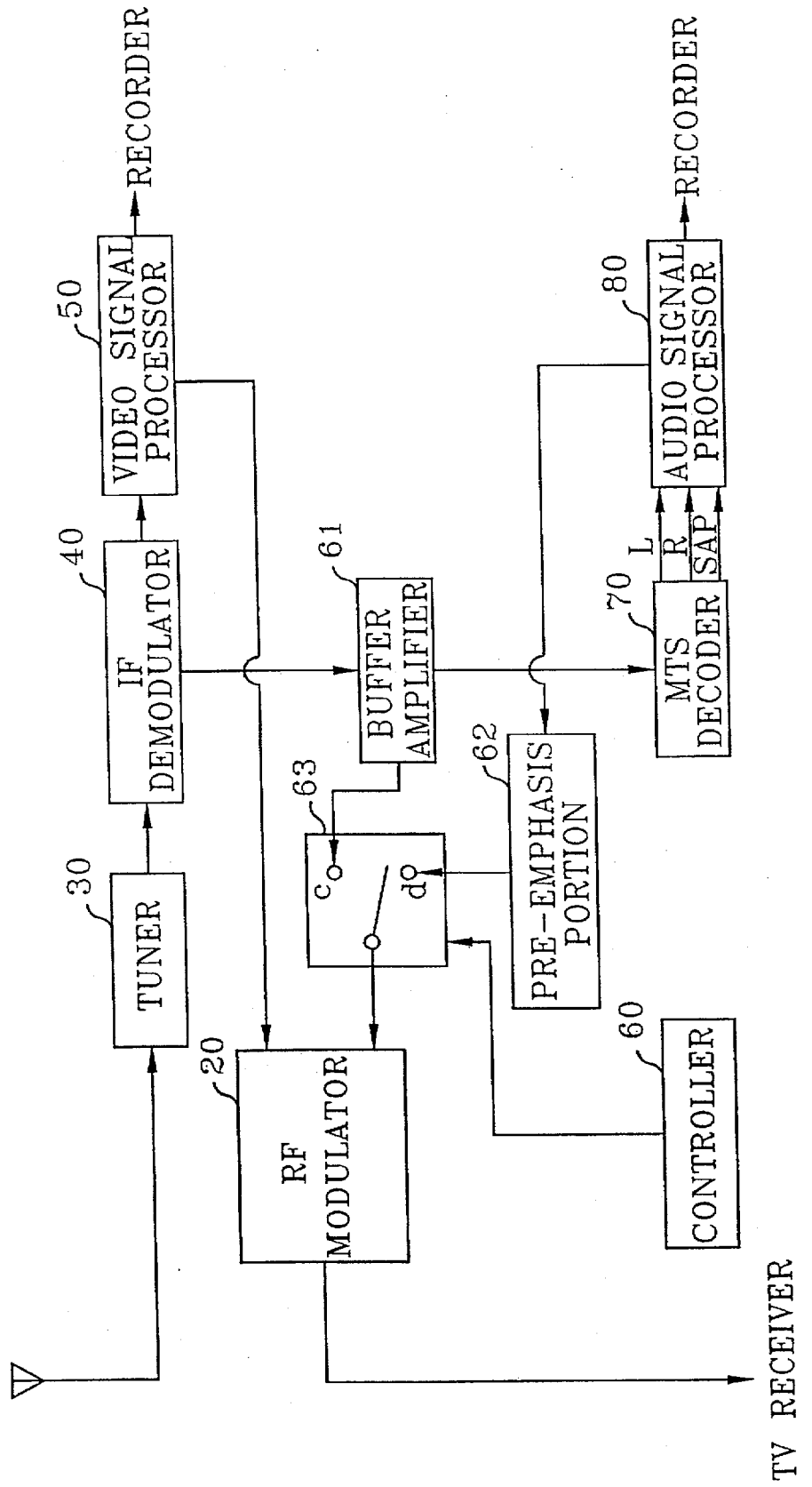
FIG. 2 is a diagram of an RF modulation apparatus according to a preferred embodiment of the present invention.

An example of an embodiment of a radio frequency (RF) modulation apparatus according to the present invention is shown in FIG. 2. Specifically, the apparatus comprises an RF modulator 20, a tuner 30, an intermediate frequency (IF) demodulator 40, a video signal processor 50, a controller 60, a buffer amplifier 61, a pre-emphasis portion 62, a switch 63, a multi-television sound (MTS) decoder 70, and an audio signal processor 80.

The tuner 30 inputs video and audio signals via an antenna, cable, or other broadcast means and selectively outputs a particular video signal and a particular audio signal which are broadcast on a selected channel. Then, the particular audio and video signals are output to the IF demodulator 40, and the demodulator 40 demodulates the signals into a video IF signal and an audio IF signal.

The video IF signal is output to the video signal processor 50 which generates a corresponding a processed video signal. Subsequently, the processed video signal is output to a video recorder and the RF modulator 20.

The audio IF signal comprises an MTS signal which is previously generated by multiplexing an audio multiplexing signal and a stereophonic audio signal. Then, the audio IF signal is output to the buffer amplifier 61, and the amplifier 61 amplifies the audio IF signal to produce an amplified audio signal and stores the amplified audio signal.

The amplified audio signal is output to the MTS decoder 70 which demultiplexes and/or demodulates such signal. For example, the decoder 70 demultiplexes and/or demodulates the MTS signal into the left and right components L and R of the stereophonic audio signal and demodulates the MTS signal into a second audio program signal SAP corresponding to the audio multiplexing signal. Subsequently, the signals L, R, and SAP are output to the audio signal processor 80, and the processor 80 processes the signals L, R, and SAP to generate a corresponding processed audio signal.

The processed audio signal is output to the video recorder and the pre-emphasis portion 62. The pre-emphasis portion 62 is used to restore portions of the audio signal which have been weakened in order to remove noise from the signal. For example, when a signal is received, certain portions of the signal are deemphasized in order to reduce noise contained in the high frequency band of the signal. Accordingly, the pre-emphasis portion 62 emphasizes the certain portions of the processed audio signal to produce a pre-emphasized audio signal.

The switch 63 inputs the amplified audio signal from the buffer amplifier 61, the pre-emphasized audio signal from the pre-emphasis portion, and a switching control signal from the controller 60. Then, the switch 63 selectively outputs either the amplified audio signal or the pre-emphasized audio signal as a selected audio signal based on the switching control signal. In particular, the controller 60 outputs the control signal to instruct the switch 63 to selectively output the amplified audio signal from the buffer amplifier 61 when the audio signal is a stereophonic audio signal and/or an audio multiplexing signal. On the other hand, the control signal instructs the switch 63 to selectively output the pre-emphasized signal from the pre-emphasis portion 62 when the audio signal is a mono audio signal.

The controller 60 may determine the type of audio signal received by the modulation apparatus based on the output of the MTS decoder 70, the signal input by the tuner 30, or preprogrammed information. Alternatively, the controller 60 may determine the type of the received audio signal according to other techniques known in the art. In addition, the switch 63 may be any number of switches which can perform the switching function above. For example, the switch 63 may be a mechanical switch, an electrical switch, a transistor, etc.

The selected audio signal is output to the RF modulator 20, and the modulator 20 modulates the processed video signal and the selected audio signal into television broadcast frequency signals. Subsequently, the frequency signals are output to one or more television receivers.

The operation of the RF modulation apparatus when it receives a particular audio signal comprising a stereophonic audio signal and/or an audio multiplexing signal will be described below. First, the particular audio signal is output by the tuner 30 and demodulated into an audio IF signal by the IF demodulator 40. Then, the audio IF signal is amplified by the buffer amplifier 61, and the amplified audio signal is output to the switch 63. Since the received audio signal comprises a stereophonic audio signal and/or an audio multiplexing signal, the controller 60 outputs the control signal to instruct the switch 63 to selectively output the amplified audio signal to the RF modulator 20 as the selected audio signal.

Accordingly, the RF modulator 20 inputs and modulates the selected audio signal and outputs corresponding broadcast frequency signals to one or more television receivers. Since the selected audio signal has not been previously demultiplexed and/or demodulated by the MTS decoder 70, a television receiver which receives the broadcast frequency signal is capable of demodulating such signal for the first time via its own demodulator. Therefore, since the selected audio signal comprises a stereophonic audio signal and/or an audio multiplexing signal, a viewer watching the television receiver can listen to the stereophonic audio signal and/or an audio multiplexing signal via the television receiver.

The operation of the RF modulation apparatus when it receives a particular audio signal comprising a mono audio signal will be described below. First, the particular audio signal is output by the tuner 30 and demodulated into an audio IF signal by the IF demodulator 40. Then, the audio IF signal is amplified by the buffer amplifier 61, and the amplified audio signal is output to the MTS decoder 70.

Subsequently, the decoder 70 demultiplexes and/or demodulates the amplified audio signal, and the processor 80 processes such signal to generate a processed audio signal. The processed audio signal is then input by the pre-emphasis portion 62 which outputs a corresponding pre-emphasized audio signal. Since the received audio signal comprises a mono audio signal, the controller 60 outputs a control signal to instruct the switch 63 to selectively output the pre-emphasized audio signal to the RF modulator 20 as the selected audio signal. Accordingly, the RF modulator 20 inputs and modulates the selected audio signal and outputs corresponding broadcast frequency signal to one or more of the television receivers.

As described above, the RF modulation apparatus selectively outputs an audio signal to the RF modulator 20 without demultiplexing and/or demodulating the signal when the audio signal comprises a stereophonic audio signal or an audio multiplexing signal. Thus, the audio signal is modulated by the RF modulator 20 and demodulated by the audio multiplexing demodulator of the television receiver. As a result, the RF modulation apparatus enables a viewer to listen to the stereophonic audio signal and the audio multiplexing signal even though such signal has been modulated by the RF modulator 20.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A radio frequency (RF) modulation apparatus for modulating an input video signal and an input audio signal into a television broadcast signal, comprising:

a memory device which stores said input audio signal as a stored audio signal;

a decoder which inputs said stored audio signal from said memory device and decodes said stored audio signal to produce a decoded audio signal;

switching means for inputting said stored audio signal and said decoded audio signal and for selectively outputting either said stored audio signal or said decoded audio signal as a selected audio signal, wherein said switching means outputs said stored audio signal as said selected audio signal if said input audio signal corresponds to a first audio signal and wherein said switching means outputs said decoded audio signal as said selected audio signal if said input audio signal corresponds to a second audio signal; and an RF modulator which modulates said selected audio signal and outputs said television broadcast signal.

2. The radio frequency (RF) modulation apparatus according to claim 1, wherein said first audio signal comprises one of a stereophonic audio signal and an audio multiplexing signal.

3. The radio frequency (RF) modulation apparatus according to claim 2, wherein said second audio signal comprises a mono audio signal.

4. The radio frequency (RF) modulation apparatus according to claim 1, wherein said memory device comprises a buffer amplifier which amplifies said input audio signal to produce an amplified audio signal and stores said amplified audio signal as said stored audio signal.

5. The radio frequency (RF) modulation apparatus according to claim 1, wherein said decoder comprises a multi-television sound (MTS) decoder which inputs said stored audio signal, demultiplexes said stored audio signal into audio component signals, and outputs said audio component signals as said decoded audio signal.

6. The radio frequency (RF) modulation apparatus according to claim 1, wherein said decoder comprises:

a multi-television sound (MTS) decoder which inputs said stored audio signal and demultiplexes said stored audio signal into audio component signals; and an audio signal processor which inputs and processes said audio component signals to produce said decoded audio signal.

7. The radio frequency (RF) modulation apparatus according to claim 1, further comprising an intermediate frequency (IF) demodulator which inputs and demodulates a particular audio signal to produce said input audio signal.

8. The radio frequency (RF) modulation apparatus according to claim 7, further comprising a tuner which tunes a selected channel and outputs said particular audio signal on said selected channel.

9. A radio frequency (RF) modulation apparatus for modulating an input video signal and an input audio signal into a television broadcast signal, comprising:

a buffer amplifier which amplifies said input audio signal to produce an amplified audio signal and stores said amplified audio signal as a stored audio signal;

a decoder which inputs said stored audio signal and decodes said stored audio signal to produce a decoded audio signal;

switching means for inputting said stored audio signal and said decoded audio signal and for selectively outputting either said stored audio signal or said decoded audio signal as a selected audio signal, wherein said switching means outputs said stored audio signal as said selected audio signal if said input audio signal corresponds to one of a stereophonic audio signal and an audio multiplexing signal and wherein said switching means outputs said decoded audio signal as said selected audio signal if said input audio signal corresponds to a mono audio signal; and an RF modulator which modulates said selected audio signal and outputs said television broadcast signal.

10. The radio frequency (RF) modulation apparatus according to claim 9, wherein said decoder comprises a multi-television sound (MTS) decoder which inputs said stored audio signal, demultiplexes said stored audio signal into audio component signals, and outputs said audio component signals as said decoded audio signal.

11. The radio frequency (RF) modulation apparatus according to claim 9, wherein said decoder comprises:

a multi-television sound (MTS) decoder which inputs said stored audio signal and demultiplexes said stored audio signal into audio component signals; and an audio signal processor which inputs and processes said audio component signals to produce said decoded audio signal.

12. A radio frequency (RF) modulation apparatus for modulating an input video signal and an input audio signal into a television broadcast signal, comprising:

a memory device which stores said input audio signal as a stored audio signal;

a decoder which inputs said stored audio signal from said memory device and decodes said stored audio signal to produce a decoded audio signal;

a pre-emphasis portion which emphasizes a de-emphasized part of said decoded audio signal to produce a pre-emphasized audio signal, wherein said de-emphasized part corresponds to a portion of said input audio signal which is weakened when said input audio signal is received in order to remove noise from said decoded audio signal;

switching means for inputting said stored audio signal and said pre-emphasized audio signal and for selectively outputting either said stored audio signal or said pre-emphasized audio signal as a selected audio signal, wherein said switching means outputs said stored audio signal as said selected audio signal if said input audio signal corresponds to a first audio signal and wherein said switching means outputs said pre-emphasized audio signal as said selected audio signal if said input audio signal corresponds to a second audio signal; and an RF modulator which modulates said selected audio signal and outputs said television broadcast signal.

13. The radio frequency (RF) modulation apparatus according to claim 12, wherein said first audio signal comprises one of a stereophonic audio signal and an audio multiplexing signal.

14. The radio frequency (RF) modulation apparatus according to claim 13, wherein said second audio signal comprises a mono audio signal.

15. The radio frequency (RF) modulation apparatus according to claim 12, wherein said memory device comprises a buffer amplifier which amplifies said input audio signal to produce an amplified audio signal and stores said amplified audio signal as said stored audio signal.

16. The radio frequency (RF) modulation apparatus according to claim 12, wherein said decoder comprises a multi-television sound (MTS) decoder which inputs said stored audio signal, demultiplexes said stored audio signal into audio component signals, and outputs said audio component signals as said decoded audio signal.

17. The radio frequency (RF) modulation apparatus according to claim 12, wherein said decoder comprises:

a multi-television sound (MTS) decoder which inputs said stored audio signal and demultiplexes said stored audio signal into audio component signals; and an audio signal processor which inputs and processes said audio component signals to produce said decoded audio signal.

18. The radio frequency (RF) modulation apparatus according to claim 12, further comprising an intermediate frequency (IF) demodulator which inputs and demodulates a particular audio signal to produce said input audio signal.

19. The radio frequency (RF) modulation apparatus according to claim 7, further comprising a tuner which tunes a selected channel and outputs said particular audio signal on said selected channel.

20. A radio frequency (RF) modulation apparatus for modulating an input video signal and an input audio signal into a television broadcast signal, comprising:

a buffer amplifier which amplifies said input audio signal to produce an amplified audio signal and stores said amplified audio signal as a stored audio signal;

a decoder which inputs said stored audio signal and decodes said stored audio signal to produce a decoded audio signal;

a pre-emphasis portion which emphasizes a de-emphasized part of said decoded audio signal to produce a pre-emphasized audio signal, wherein said de-emphasized part corresponds to a portion of said input audio signal which is weakened when said input audio signal is received in order to remove noise from said decoded audio signal;

switching means for inputting said stored audio signal and said pre-emphasized audio signal and for selectively outputting either said stored audio signal or said pre-emphasized audio signal as a selected audio signal, wherein said switching means outputs said stored audio signal as said selected audio signal if said input audio signal corresponds to one of a stereophonic audio signal and an audio multiplexing signal and wherein said switching means outputs said pre-emphasized audio signal as said selected audio signal if said input audio signal corresponds to a mono audio signal; and an RF modulator which modulates said selected audio signal and outputs said television broadcast signal.

21. The radio frequency (RF) modulation apparatus according to claim 20, wherein said decoder comprises a multi-television sound (MTS) decoder which inputs said stored audio signal, demultiplexes said stored audio signal into audio component signals, and outputs said audio component signals as said decoded audio signal.

22. The radio frequency (RF) modulation apparatus according to claim 20, wherein said decoder comprises:

a multi-television sound (MTS) decoder which inputs said stored audio signal and demultiplexes said stored audio signal into audio component signals; and an audio signal processor which inputs and processes said audio component signals to produce said decoded audio signal.

* * * * *